US008583090B2

(12) United States Patent
Vartiainen et al.

(10) Patent No.: US 8,583,090 B2
(45) Date of Patent: Nov. 12, 2013

(54) TRANSFERRING TASK COMPLETION TO ANOTHER DEVICE

(75) Inventors: Elina Vartiainen, Helsinki (FI); Andrei Popescu, London (GB); Virpi Roto, Espoo (FI); Guido Grassel, Espoo (FI); Mika Rautava, Espoo (FI)

(73) Assignee: Nokia Corporation, Espoo (FI)

( * ) Notice: Subject to any disclaimer, the term of this patent is extended or adjusted under 35 U.S.C. 154(b) by 914 days.

(21) Appl. No.: 11/617,965

(22) Filed: Dec. 29, 2006

(65) Prior Publication Data

US 2008/0160974 A1   Jul. 3, 2008

(51) Int. Cl.
*H04B 7/24* (2006.01)
*G06F 15/16* (2006.01)

(52) U.S. Cl.
USPC ........... 455/414.3; 455/39; 709/228; 709/211

(58) Field of Classification Search
USPC ......... 455/39, 415, 414.3; 709/220, 228, 211, 709/237, 229, 230, 224
See application file for complete search history.

(56) References Cited

U.S. PATENT DOCUMENTS

| | | | | |
|---|---|---|---|---|
| 2002/0129126 | A1* | 9/2002 | Chu et al. | 709/220 |
| 2003/0115357 | A1* | 6/2003 | Chu et al. | 709/237 |
| 2003/0120784 | A1* | 6/2003 | Johnson et al. | 709/228 |
| 2005/0245245 | A1 | 11/2005 | Sorvari et al. | |
| 2006/0242273 | A1* | 10/2006 | Fiducci | 709/220 |
| 2007/0067104 | A1* | 3/2007 | Mays | 701/211 |
| 2007/0079175 | A1* | 4/2007 | Cheng et al. | 714/13 |

FOREIGN PATENT DOCUMENTS

| | | |
|---|---|---|
| EP | 1 215 575 A2 | 6/2002 |
| EP | 1215575 A2 * | 6/2002 |
| EP | 1 672 498 A1 | 6/2006 |
| EP | 1 760 584 A1 | 3/2007 |
| WO | WO 00/34891 A2 | 6/2000 |
| WO | WO 2005/109829 A1 | 11/2005 |
| WO | WO 2006/028520 A1 | 3/2006 |

OTHER PUBLICATIONS

International Search Report and Written Opinion for Application No. PCT/IB2007/004093 dated Aug. 5, 2008.
Documents To Go for Symbian Series 80: Word and Excel Files on your Nokia 9300 & 9500 Smartphone [online] [retrieved Dec. 8, 2006]. Retrieved from the Internet: <URL: http://www.dataviz.com/products/documentstogo/series80/index.html>. 3 pages.
Documents To Go for Symbian Series 80: Key Features [online] [retrieved Dec. 8, 2006]. Retrieved from the Internet: <URL: http://www.dataviz.com/products/documentstogo/series80/dxtgs80_keyfeatures.html>. 3 pages.

* cited by examiner

*Primary Examiner* — Nizar Sivji
(74) *Attorney, Agent, or Firm* — Alston & Bird LLP

(57) ABSTRACT

A mobile communication device is adapted to identify a task for postponed transfer to a computing device over a local communication link. A similar transfer task function is established on the computing device for receiving the identified task and any required related data. The user is provided with the ability to initiate a task on the mobile communication device and continue or complete the task on a computer.

17 Claims, 9 Drawing Sheets

TRANSFERRING TASK COMPLETION TO ANOTHER DEVICE

BACKGROUND

1. Field

The disclosed embodiments generally relate to the use of a mobile communication device to perform certain tasks and in particular to postponing the completion of a task and transferring a file relating to such task for completion to a computing device having greater application resources.

2. Brief Description of Related Developments

Mobile communication devices are now capable of performing many tasks including browsing the internet, obtaining data, entering data, storing and manipulating such data, word processing and many other tasks. These tasks are restrained, however, by the limited application resources available on the typical mobile communication device.

Today's mobile communication devices enable users to, for example, check their e-mail or browse the web, while they are on the move. However, these devices generally have limited input capabilities and, for example, a task that requires writing a long textual reply to an email message may require an inordinate effort by the user. Still the user might have an idea for a reply that he or she would like to enter in abbreviated form for later use in completing the task. In addition when a task includes a search and uncovers a document, the mobile device may not support all of the formats for the wide variety of documents available to the user on the Internet. In such tasks, the user may want to check the documents later using a personal computer or other computer device that offers a wider variety of formats and resource applications. It would be advantageous to provide an application that enables the user to save the task file including its related data, documents, emails, internet sites, etc. and transfer the file to a computer device for completion at a later time using the computer device.

Applications such as Microsoft's Outlook provide a feature that allows the user to create tasks that may be synchronized with mobile devices having a calendar. This feature uses an associated application such as, "PC Suite". These tasks may generally be described only with text and cannot link the tasks to, for example, documents, email, or other data.

U.S. publication no. 20050245245, describes a way to distribute tasks over time in a mobile terminal and deals with task completion on a mobile communication device. It relates to a method that does the task completion automatically, when the device is connected to a charging device. The charging device may be intelligent and have memory or processing power to help with the task completion. However, it is noted there is no user interaction and the charging device does not have any input capabilities. This system is designed solely to utilize the normal down time during charging of the mobile communication device to complete a task, so that the use of the mobile communication device need not be monopolized to accomplish tasks that can just as easily be performed at a later time.

In many instances it would be advantageous to save a task file created on a mobile communication device for completion on a computer device such as a personal computer (PC), laptop or the like that has superior application resources and is more easy to operate. The transfer of a task from the computer device to the mobile communication device may also be advantageous in situations where a user must travel to a different location at a time that would otherwise require an interruption in performance of a task. By transferring a task to the mobile communication device, it may be possible to work on a task, started on a personal computer for example, using the mobile communication device while traveling.

SUMMARY

In one embodiment, a mobile communication device is adapted to identify a task for postponed transfer to a computing device. A similar transfer task function is established on the computing device for receiving the identified task and any required related data, i.e. the task file. This provides the user with the ability to complete the task on a computer if desirable. The mobile communication device and computer device may also be adapted to transfer an identified task file from the computer device to the mobile communication device for continuation or completion of the task on the mobile communication device.

In one embodiment a transfer application program is adapted to synchronize activities between, for example, a PC based web browser and the web browser of a mobile communication device using, a local connection, such as BLUETOOTH connectivity. The transfer application is adapted to establish a two-way communication connection to enable the transfer of data identified in a PC web browser to a web browser on a mobile communication device. This transfer may include both active and passive data, for example, web pages being currently browsed and bookmarks and favorite settings. The solution would thus allow a user to establish a seamless similarity of browsing experience between the PC and mobile browsing services.

The transfer application of one embodiment may consist of several basic modules, one running on the mobile terminal, as an internet/web browser, and the other on the PC as an internet/web browser and a transfer/synchronization module. The transfer application may also be adapted to transfer a task file from a mobile communication device to a computer device to enable the performance of a task, initiated on the mobile communication device, using application resources of the computer device other than a web browser.

In another embodiment, a system is adapted to provide a cheaper and faster means for mobile browsing, utilizing a local connection between the mobile communication device and a computer device. This enables the user to have a more useful and flexible mobile browsing experience, while in range of local wireless connection to a personal computer. It also provides the capability of a mobile continuation of an internet search or browse, initiated on the PC, beginning from the point/page where they left off on the PC browser.

In another embodiment a transfer application is provided for use in conjunction with a mobile communication device and computer device that allows a user to mark task items, initiated on a mobile device, as tasks that he/she wants to complete on a PC. This allows the user to initiate a task using the limited resources available on the mobile communication device, for example, by reading messages or documents and making related notes, but also allows the user to complete the task using the more sophisticated applications resident on the computer device. In addition tasks initiated on a computer device may be transferred and continued or completed on the mobile communication device when the user is on the move.

The task items are included in a list of tasks that is synchronized between the mobile communication device and computer device. The items may be marked as tasks when the mobile device is not connected to the PC, and may be sent to the PC later on, after a connection is established, and vice versa.

Another embodiment is related to a method that includes: initiating a task on a mobile communication device; identifying the task as a task for completion on a computer device; studying the task; entering notes related to the completion of the task; associating the notes with the identified task to form a task file; establishing a connection between a computer device and the mobile communication device; and transferring the identified task and related notes to the computer device for completion of the task.

Another embodiment is related to a method that includes: initiating a task on a computer device; identifying the task as a task for continuation or completion on a mobile communication device; associating data with the identified task; establishing a connection between the computer device and a mobile communication device; and transferring the identified task and related data to the mobile communication device for continuation or completion of the task.

BRIEF DESCRIPTION OF THE DRAWINGS

The foregoing aspects and other features of the embodiments are explained in the following description, with reference to the accompanying drawings, in which.

DETAILED DESCRIPTION OF EXEMPLARY EMBODIMENTS

Figure 1:
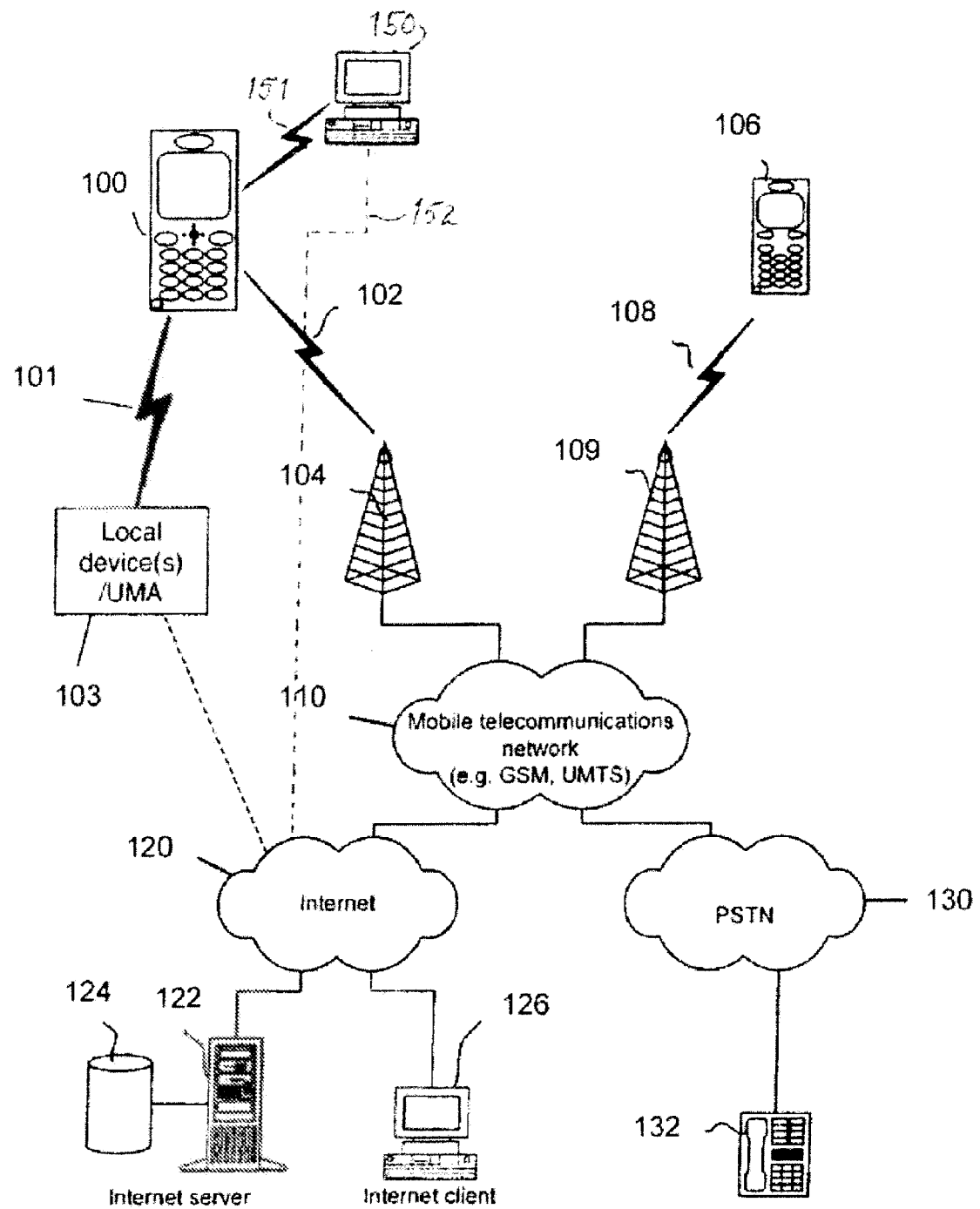
FIG. 1 shows a schematic illustration of a cellular telecommunication system, as an example of an environment in which aspects of the embodiments may be applied.

FIG. 1 is a schematic illustration of a cellular telecommunications system, as an example, of an environment in which a communications device 100 incorporating features of an exemplary embodiment may be applied. Although the embodiments disclosed will be described with reference to the drawings, it should be understood that they may take many alternate forms. In addition, any suitable size, shape, type of elements or combination of components could be used.

In the telecommunication system of FIG. 1, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 100 and other devices, such as another mobile terminal 106, a stationary telephone 132, a personal computer 151 or an internet server 122. It is to be noted that for different embodiments of the mobile terminal 100 and in different situations, some of the telecommunications services indicated above may or may not be available. The aspects of the invention are not limited to any particular set of services in this respect.

The mobile terminals 100, 106 may be connected to a mobile telecommunications network 110 through radio frequency (RF) links 102, 108 via base stations 104, 109. The mobile telecommunications network 110 may be in compliance with any commercially available mobile telecommunications standard such as GSM, UMTS, D-AMPS, CDMA2000, FOMA and TD-SCDMA.

The mobile telecommunications network 110 may be operatively connected to a wide area network 120, which may be the internet or a part thereof. An internet server 122 has data storage 124 and is connected to the wide area network 120, as is an internet client computer 126. The server 122 may host a www/hap server capable of serving www/hap content to the mobile terminal 100.

For example, a public switched telephone network (PSTN) 130 may be connected to the mobile telecommunications network 110 in a familiar manner. Various telephone terminals, including the stationary telephone 132, may be connected to the PSTN 130.

The mobile terminal 100 is also capable of communicating locally via a local link 101 or 151 to one or more local devices 103 or 150. The local links 101 or 151 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 103 can, for example, be various sensors that can communicate measurement values to the mobile terminal 100 over the local link 101. The above examples are not intended to be limiting, and any suitable type of link may be utilized. The local devices 103 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 100 may thus have multi-radio capability for connecting wirelessly using mobile communications network 110, WLAN or both. Communication with the mobile telecommunications network 110 may also be implemented using WiFi, WiMax, or any other suitable protocols, and such communication may utilize unlicensed portions of the radio spectrum (e.g. unlicensed mobile access (UMA)).

As shown in FIG. 1, a computer device 151, for example, a personal computer (PC), laptop computer or other computer device capable of executing a variety of applications, is connected to mobile communication terminal 100 by a local link 151, as described above. In other alternate embodiments, the computer device 150 may be a tablet computer, a laptop or desktop computer, a television or television set top box or any other suitable device capable of driving a display and having supporting electronics, such as central processing unit 411 and memory 414. Computer device 150 may also be connected via broadband, cable, PSTN or other means of communication to Internet server 122. The system illustrated may be adapted to facilitate the functions of the disclosed embodiments described below.

Figure 2A:
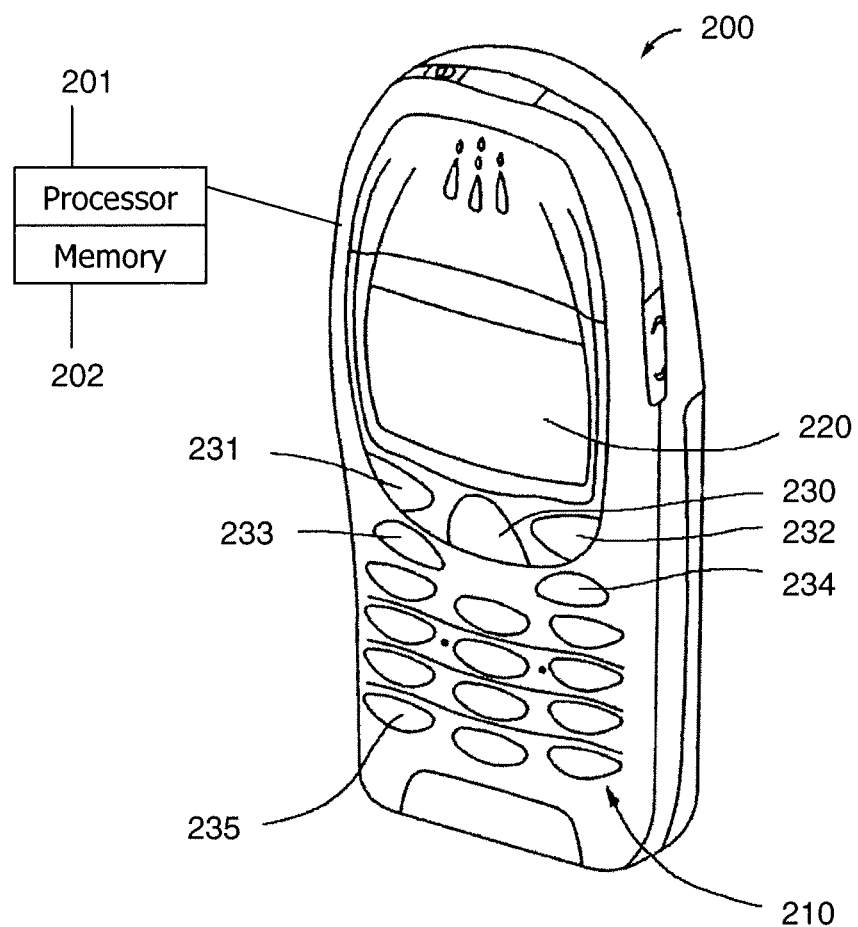
FIG. 2a shows a perspective view of one embodiment of a mobile communication device in which aspects of the disclosed embodiments may be applied.

One embodiment 200 of a terminal 100 is illustrated in more detail in FIG. 2A. The terminal or mobile communications device 200 may have a keypad 210 and a display 220. The keypad 210 may include any suitable user input devices such as, for example, a multi-function/scroll key 230, soft keys 231, 232, a call key 233 and end call key 234 and alphanumeric keys 235. The display 220 may be any suitable display, such as for example, a touch screen display or graphical user interface. The display may be integral to the device 200 or the display may be a peripheral display connected to the device 200. A pointing device, such as for example, a stylus, pen or simply the user's finger may be used with the display 220. In alternate embodiments any suitable pointing device may be used. In other alternate embodiments, the display may be a conventional display. The device 200 may also include other suitable features such as, for example, a camera, loud speaker, connectivity port or tactile feedback features. The mobile communications device may have a processor 201 connected to the display for processing user inputs and displaying information on the display 220. A memory 202 may be connected to the processor 201 for storing any suitable information and/or applications associated with the mobile communications device 200 such as phone book entries, calendar entries, etc.

Figure 2B:
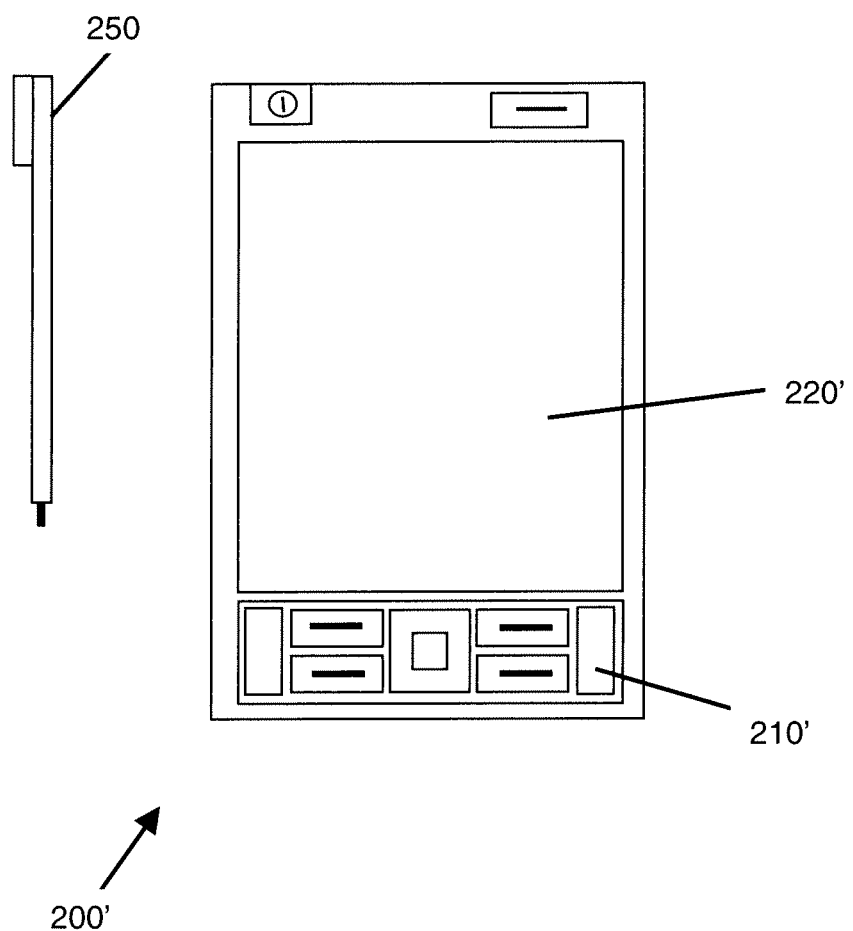
FIG. 2b shows a perspective view of another embodiment of a mobile communication device in which aspects of the disclosed embodiments may be applied.

In one embodiment, the device 100, may be for example, a PDA style device 200' illustrated in FIG. 2B. The PDA 200' may have a keypad 210', a touch screen display 220' and a pointing device 250 for use on the touch screen display 220'. The exemplary embodiments herein will be described with reference to the mobile communications device 100 for exemplary purposes only with the understanding that the embodiments could be applied equally to any suitable mobile device incorporating a display, processor, memory with supporting software or hardware and a mobile communication capability.

Figure 3A:
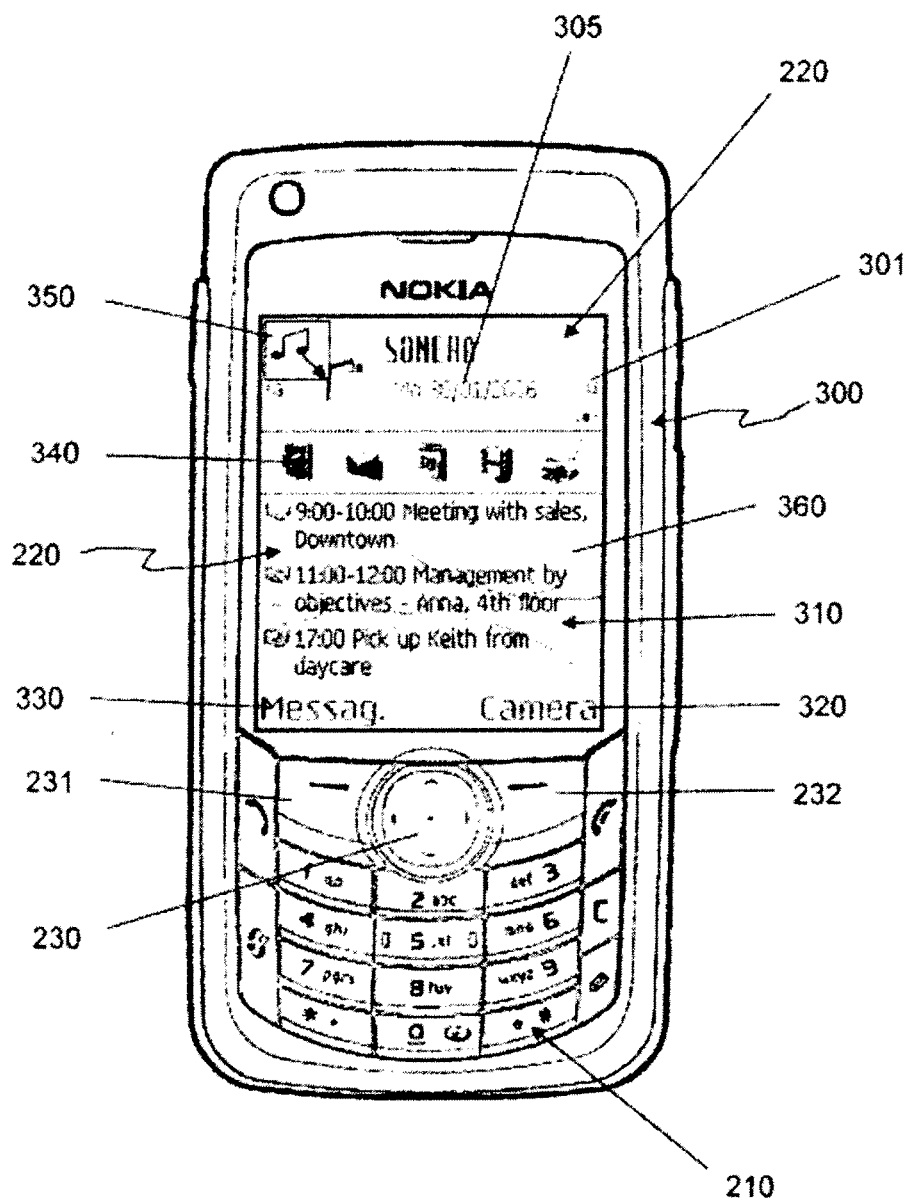
FIG. 3a shows a user interface for an embodiment of a mobile communication device in which aspects of the disclosed embodiments may be applied.

FIG. 3 illustrates a user interface 300 of the type that may be useful in the mobile communication device 100. The user interface may include display 220. The display 220 of the device 100 may include an application section 310, soft key functions 320, 330, an application bar 340, a battery indicator 301, the date 305 and any other suitable information or items. The application bar 340 may allow a user to select an application stored in the device. For example, as can be seen in FIG. 3, the application bar 340 may include a phone book, email or other messaging application, a calendar, video player, printing function and any other suitable applications. The user may use the scroll or navigation key 230 to scroll through and select an application from the application bar 340. In alternate embodiments the applications may be scrolled through and selected in any suitable manner such as, for example, via a menu of the device or with a stylus interacting with a touch screen display.

In the example of FIG. 3 the calendar function is selected for presentation on the display 220. The user's calendar entries may be presented in the application section for viewing or modification by the user. In this example, the application section 310, soft key functions 320, 330, an application bar 340, a battery indicator 301, the date 305 will collectively be referred to herein as the native application 360 (e.g. the native application is the display screen that is presented on the display before the user activates a transparent application functionality of the device as will be described in greater detail below). In alternate embodiments, the native application may be any suitable portion of the display screen including any suitable application that is running on the device.

In one embodiment, mobile communication device 100 is adapted to identify a task for postponed transfer to a computing device 150 for further effort and completion. A similar transfer task function is established on the computing device 150 for receiving the identified task and any required related data, i.e. the task file. This provides the user with the ability to complete the task on the computer device 150, if desirable. The mobile communication device 100 and computer device 150 may also be adapted to transfer an identified task in the reverse direction, namely, from the computer device 150 to the mobile communication device 100 for continuation or completion of the task on the mobile communication device 100.

In the situation where a task is initiated on communication device 100, it may involve any of the many functions available to mobile communication device 100 that are selectable through the use of the user interface 300. Such tasks could involve the use of the various telecommunications services such as cellular voice calls, www/wap browsing, cellular video calls, data calls, email, facsimile transmissions, music transmissions, still image transmission, video transmissions, electronic message transmissions and electronic commerce and any other functions that may be performed between the mobile terminal 100 and other devices available on a network such as that illustrated in FIG. 1. In some of these instances the effort needed to complete the task that is initiated may become unwieldy because of the limited application resources available on mobile communication device 100. Examples of such tasks are a lengthy reply to an email, the reading and analysis of a document, or the review of the results of an internet search.

In order to better work on the task, in one embodiment, the mobile communication device is adapted to identify the task as a task that needs to be held for transfer to computer device 150. Such identification may include any related documents and data required to perform the task compiled into a task file. The identified task, therefore, would be a file, such as a folder with the task description, documents, and data held therein. The data may include a description of the format and protocols associated with the performance of the task. In addition, it may be desirable to partially perform the task, using the limited resources available on the mobile communication device 100, by entering notes that reflect thoughts or actions that could be expanded at a later time on computer device 150. The transfer of the task file may also be desirable when a mobile operation is interrupted by arrival at a destination or other events. For example, the task could be initiated while commuting and completed after arrival at home or office.

Whatever the circumstances, the identified task may be transferred to computer device 150 by means of a local connection 151, as described above. Computer device 150 may comprise any of the devices referred to above, but preferably a device that has a higher level of application resources and capabilities than mobile communication device 100. Once transferred the task would be available for completion using computer device 150. Computer device 150 may also be adapted to identify and compile a task file or folder for transfer to mobile communication device 100. This may become desirable where the performance of a task initiated on computer device 150 is interrupted by the need to catch a plane or train and the mobile communication device 100 is available to receive the task, so that the task may be worked on during travel.

In one embodiment, communication device 100 and computer device is adapted by the storing of a transfer application program. In one embodiment, the transfer application is adapted to synchronize activities between, for example, a PC based web browser and the web browser of the mobile communication device using local connection 151.

The transfer application is adapted to establish a two-way communication connection, using local channel 151, to enable the transfer of data identified in a PC web browser to a web browser on a mobile communication device or visa versa. This transfer may include both active and passive data, for example, web pages being currently browsed and bookmarks and favorite settings. The transfer application may thus allow a user to establish a seamless similarity of browsing experience between the PC and mobile browsing services. In this embodiment, the transfer application may operate as a browser-plug-in that adds features to the existing browser or a stand alone application that operates in cooperation with the available browser.

A complete transfer application of one embodiment may consist of several basic modules, one running on the mobile terminal, such as mobile communication device 100, as an internet/web browser or stand alone application, and the other on a PC or other computer device 150, as an internet/web browser or stand alone application and a transfer/synchronization module.

Accordingly, a transfer application is provided for use in conjunction with mobile communication device 100 and computer device 150 that allows a user to mark task items, initiated on, for example, mobile communication device 100, as tasks that he/she wants to complete on computer device 150. This allows the user to begin a task using the limited resources available on the mobile communication device 100, for example, by reading messages or documents and making related notes, but also allows the user to complete the task using the more sophisticated applications resident on computer device 150. In addition tasks initiated on computer device 150 may be identified, transferred, and continued or completed on the mobile communication device 100 when the user is on the move.

In one embodiment, the transfer application allows the user to identify items in a list of tasks that is synchronized between the mobile communication device 100 and the computer device 150. The items can be marked as tasks even when the mobile communication device 100 is not connected to computer device 150, and such tasks may be sent to computer device 150 later on, when connection is established. The transfer application modules stored in the memories of mobile communication device 100 and computer device 150 are mirror programs allowing the same function to be initiated and executed on either of the devices as described above.

In one embodiment, the transfer application is adapted to generate a notice, for display on the user interface of the device, advising the user that a task has been identified.

Figure 3B:
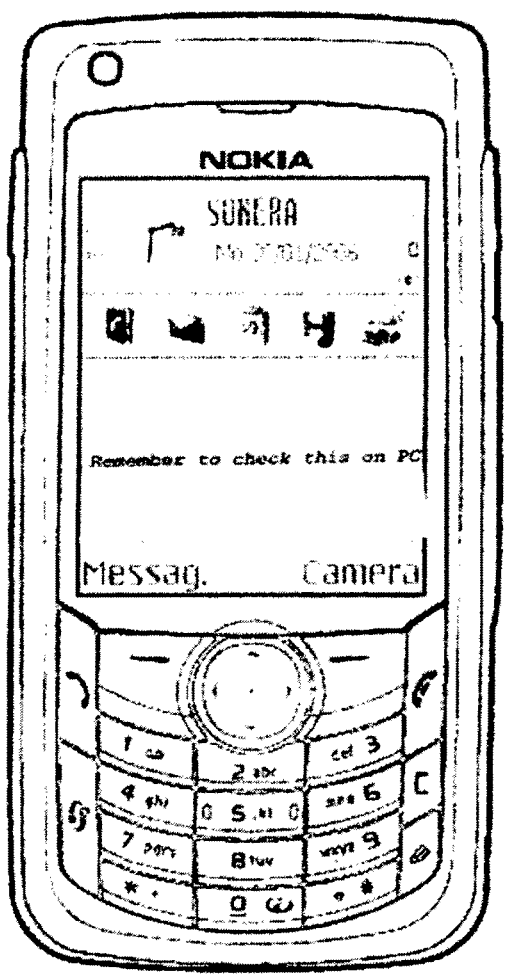
FIG. 3b shows a user interface of a mobile communication device with prompts displayed relating to disclosed embodiments.
Figure 3C:
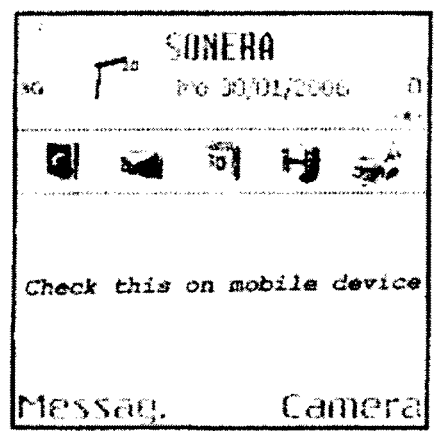
FIG. 3c shows a user interface of a computer device with prompts displayed relating to disclosed embodiments.

In one embodiment, as shown in FIGS. 3b and 3c, the notice could be in the form of a prompt displayed in the application window 360 of mobile communication device 100 as shown in FIG. 3. The prompt may comprise, for example, "Remember to check this on PC" may be displayed as indicated above or for example in the e-mail application. Computer device 150 may also offer the prompt "Remember to check this on mobile device" in the display of its user interface.

In response to the prompt, a command would be executed that adds a task to the list. A task includes information about which application was used (e-mail, text editor, etc.), what the actual message or document was (for example, an ID for an e-mail message, a URI of a document), whether the task was completed, what the user's comments were, and possibly some further information. The format of this list might be, for example, XML.

In one embodiment, in order to facilitate the mutual execution of the transfer application. The mobile phone should be provide with a list of computer devices associated with the user, for example, at home and at work, so that when the mobile communication device 100 is connected to one of the listed computer devices, it starts to synchronize the list of tasks and internet browser data, settings and preferences with the computer device.

Figure 4:
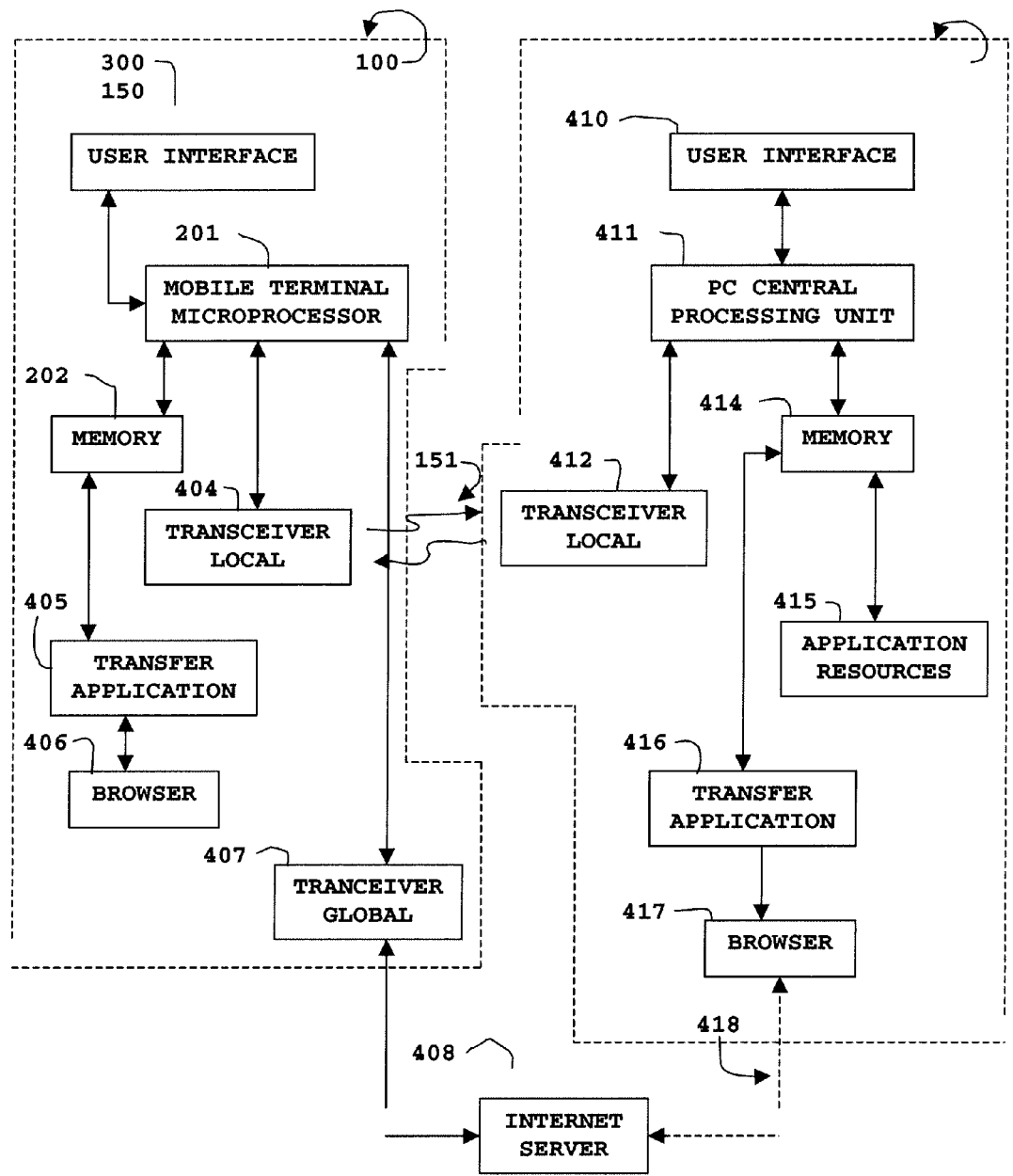
FIG. 4 is a block diagram illustrating the general architecture of a system for implementing a disclosed embodiment.

In another embodiment, a system is constructed as illustrated in FIG. 4. The system is adapted to provide a cheaper and faster means for mobile browsing, utilizing a local connection between the mobile communication device and a computer device. This enables the user to have a more useful and flexible mobile browsing experience, while in range of local wireless connection to a personal computer. It also provides the capability of a mobile continuation of an internet search or browse, initiated on computer device 150, beginning from the point/page where the user left off.

As shown in FIG. 4, an embodiment of the system of this application is assembled having a mobile communication device 100 connected though a local communications channel 151 to a computer device 150. Mobile communication device 100 includes a microprocessor controller 201, supported by memory 202 and user interface 300 and connected to provide the functions available on the mobile communication device 100 through the limited application resources stored in memory 202. A local transceiver 404 provides a communication capability for local devices, such as computer device 150. A global transceiver 407 provides a communication capability over wider range for example, to connect with Internet server 408. These communication channels are described in more detail with respect to the network illustrated in FIG. 1. Similarly computer device 150 includes central processing unit 411, supported by an interface 410 and memory 414 and connected to provide the functions available through a wide array of application resources 415 stored in memory 414. Computer device 150 may be connected to Internet server 408 though a wide variety of communication channels, as represented by reference numeral 418, such as broadband, DSL, cable, wireless, PSTN, and others.

In one embodiment, mobile communication device 100 and computer device 150 are adapted to the functions of the disclosed embodiments by the execution of transfer application programs 405 and 416 respectively. Programs 405 and 416 are similar programs adapted to the platforms/architecture of their respective devices and stored respectively in memories 202 and 414. The transfer application programs 405 and 416 may be executed in cooperation with the browser software 407 and 417 resident in memories 202 and 414 respectively. As indicated above, in this respect it may be advantageous to construct the transfer application programs as browser-plug-ins, but in an alternate embodiment may be effectively executed as stand alone application software.

Figure 5:
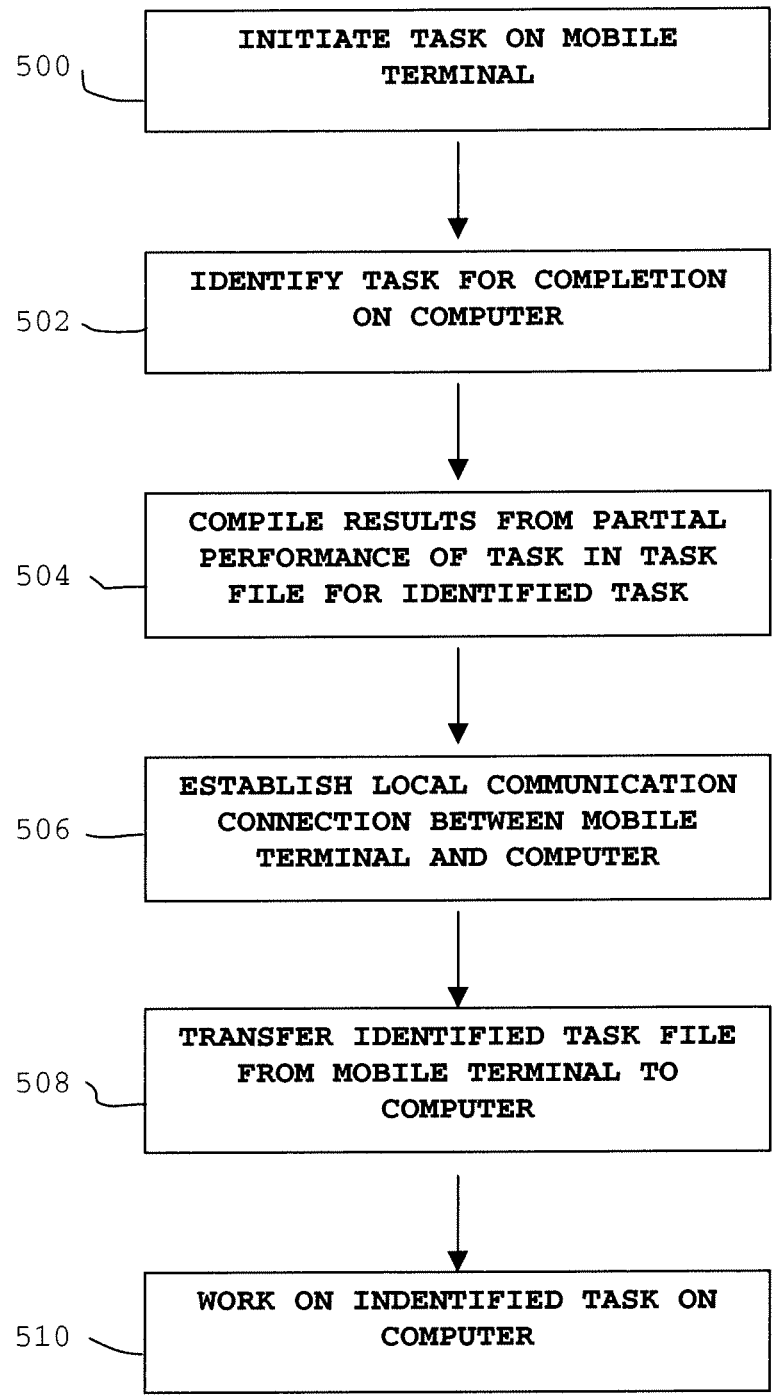
FIG. 5 illustrates a flow diagram of a method in accordance with a disclosed embodiment.

Another embodiment is related to a method, as illustrated in FIG. 5, that includes: initiating a task on a mobile communication device at 500; identifying the task as a task for completion on a computer device at 502; studying the task; entering notes related to the completion of the task; compiling related documents, i.e. web pages, email messages, related formats and protocols, with the notes at 504; and associating the notes and related documents with the identified task to form a task file; establishing a connection between a computer device and the mobile communication device at 506; and transferring the identified task file including the related notes to the computer device at 508 for completion of the task at 510.

As indicated above, upon establishment of a connection between the mobile terminal and a predetermined computer, the internet browser settings may be synchronized to provide a smooth transition in task performance from one device to the other.

Figure 6:
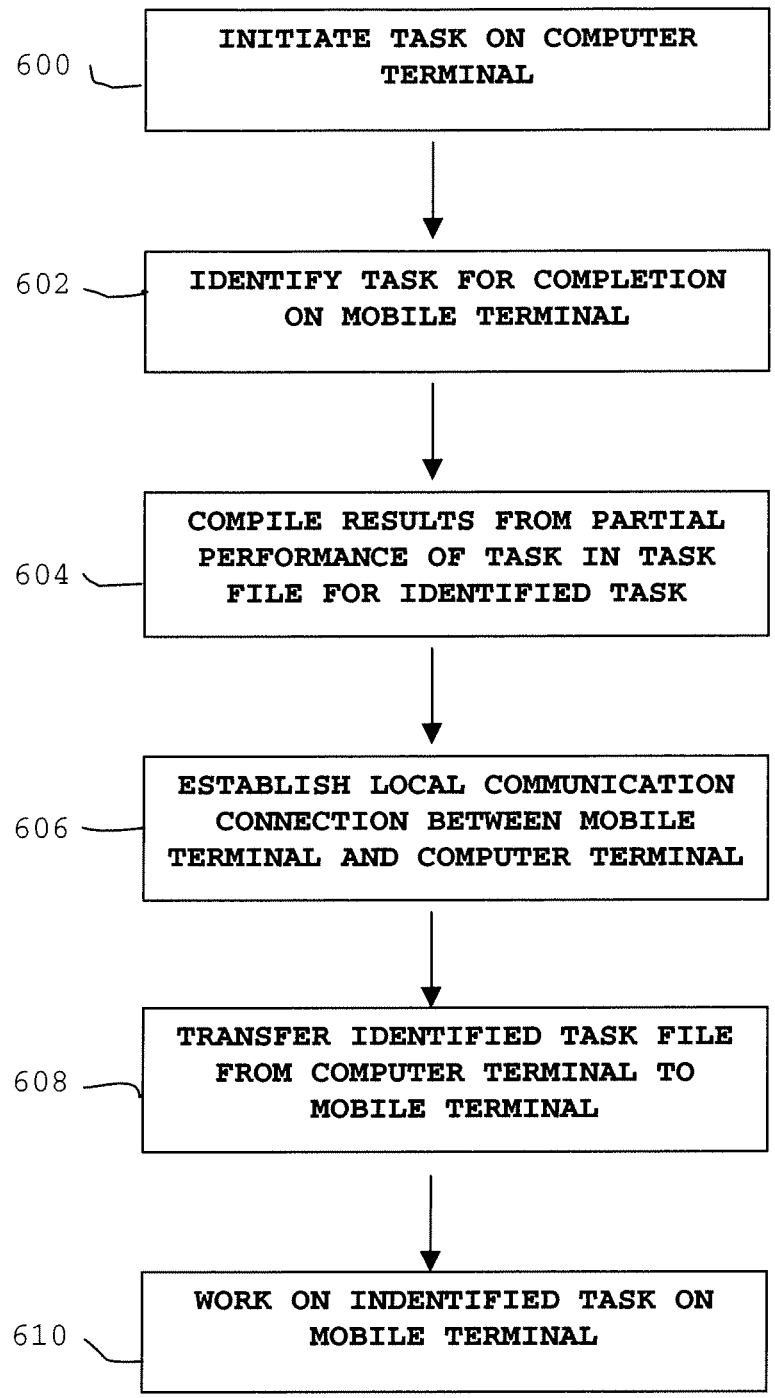
FIG. 6 illustrates a flow diagram of a method in accordance with an alternate embodiment.

Another embodiment is related to a method as shown in FIG. 6, which represents a transfer in the reverse direction of the embodiment of FIG. 5, and would include: initiating a task on a computer device at 600; identifying the task as a task for continuation or completion on a mobile communication device at 602; associating a file with the identified task at 604; establishing a connection between the computer device and a mobile communication device at 606; and transferring the identified task and related data to the mobile communication device at 608 for continuation or completion of the task at 610.

As an example of the operation of the method embodiments, a particular task may consist of marking an e-mail on a mobile device to be answered on a PC. In the performance of this task the following sequence may occur:

The user reads an e-mail message on his or her mobile device on the way to work.

The user disagrees with the content of the e-mail message and immediately thinks of a couple of arguments for use in formulating a response.

The user decides that it is too laborious to answer the e-mail with the mobile terminal, and decides to prepare the reply after arrival at work on an office PC.

The user marks this e-mail as a task with a command "Remember to check this on PC" and adds a note including the arguments entered with respect to the task.

When the user arrives to work, the mobile device synchronizes itself with the PC, and the PC notifies the user about the e-mail to which a reply is needed.

In another example, a task involves the user reading a document with the mobile terminal after leaving from work.

The user downloads an article to the PC at work.

The user starts to read the article.

The user notices that he or she has to leave from work to catch a train and marks the document on the PC with a command "Remember to check this on mobile device" and including a note about what has been read.

The user connects the PC to the mobile terminal and synchronizes the task on mobile device before leaving the work place.

The user continues reading the article on the train.

While the above disclosed embodiments are described herein with reference to information relating to a task, it should be understood that such information can include any suitable information document, file or format, such as for example, text document(s), spreadsheet(s), graphics presentation(s), powerpoint presentation(s), PDF document(s), multimedia files and documents or any other suitable information presentation format. In one embodiment, a browser may be used to request information from a network, such as for example, the Internet. This information can comprise any suitable information that might be stored or found, such as for example, a document or file. This information, which may be generally referred to as documents herein, can include any information that might be made available, on for example, the Internet or World Wide Web ("WWW"), and can include text, images, graphics, photographs, video or other multimedia information.

The browser 406 as illustrated in FIG. 4 will generally comprise a browser with the described functionality built-in or a browser with a plug-in installed that implements the described functionality. The term "browser" or "browsing" is used in a known sense herein, to generally mean or refer to software that allows a user to move from one web page or web site to another, and further allows documents from the World Wide Web and the Internet to be displayed. The term "browser plug-in" is generally used to refer to one or more programs that can be installed to add one or more features or functions to a browser, such as for example, a Web browser. Although the terms "browser" and "browser plug-in" are used herein, the scope of the disclosed embodiments are not intended to be limited by the use of such terms, and in alternate embodiments, any suitable program(s), device(s) or systems that provide the capability to "surf" the Internet, view and retrieve documents and web pages, and add features to such programs or systems, can be used.

The user can instruct or request the browser to download data or information, such as from the Internet, which commonly is in the form a document, file or web page of a web site. The form of the data, files or information that can be obtained, retrieved or downloaded is not to be considered limiting as to the scope of the disclosed embodiments. In alternate embodiments, the user can utilize any suitable system or devices to download information and data from, from example a network.

The browser 406 may generate a series of display screens on user interface 300 of mobile communication device 100. The browser 406 may be configured to allow the user to initiate a task on a mobile communication device using the Internet through the activation of prompts, such as icons, menus, displayed commands, and the like. The display may be configured to allow the identification of the task from a list of tasks, as a task to be continued on a computer device. The transfer application may be presented on the display and configured to provide a selection of activities including the compilation of documents, data, and information relating to the task into a task file associated with the identified task. By activating a prompt presented on the display, a communication connection may be established between the computer device and the mobile communication device and further the identified file and task file may be transferred from the mobile communication device to the computer device for continuing performance of the task.

Figure 7:
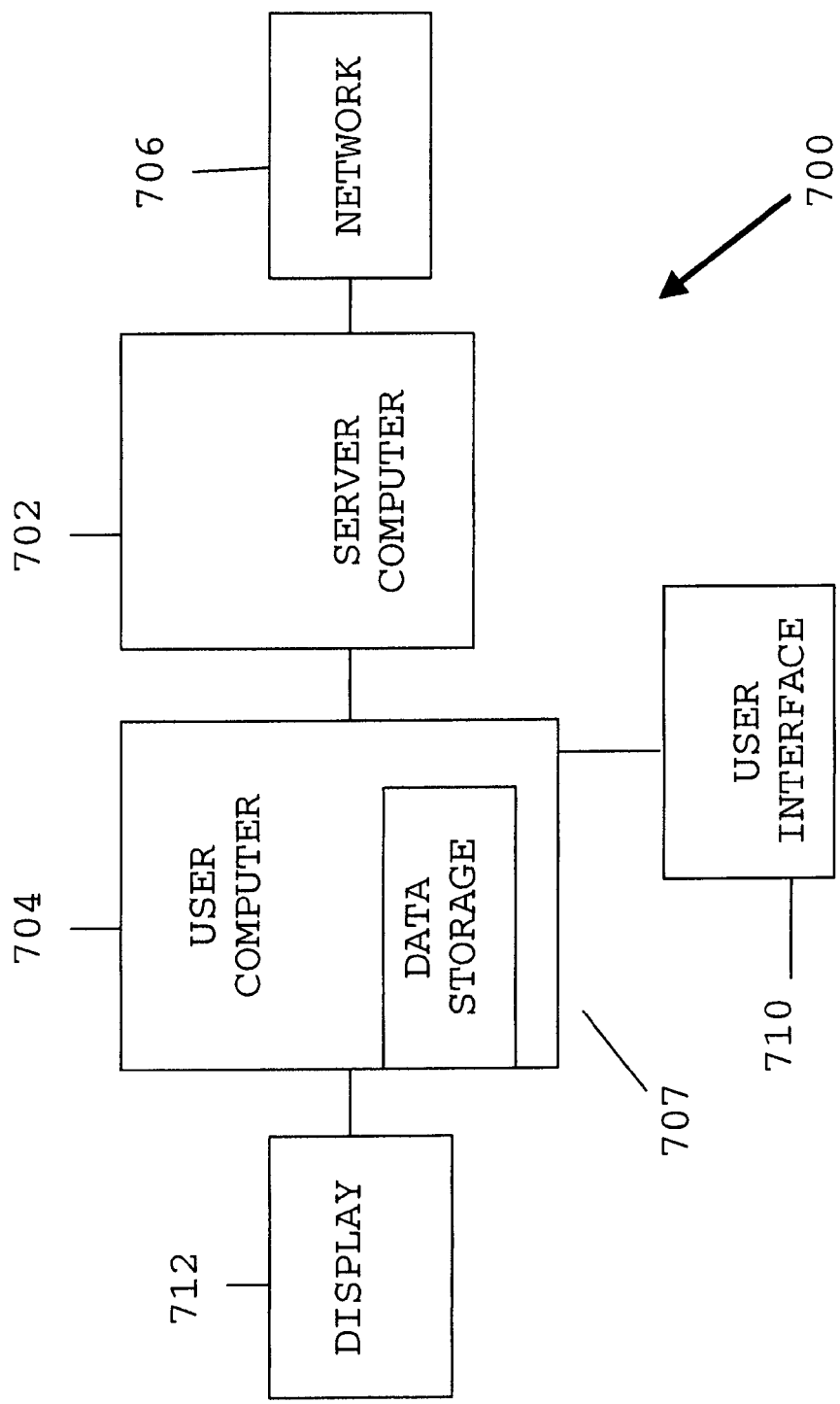
FIG. 7 illustrates a block diagram of an example of an apparatus incorporating features that may be used to practice aspects of the disclosed embodiments.

The disclosed embodiments may also include software and computer programs incorporating the process steps and instructions described above that are executed in different computers. FIG. 7 is a block diagram of one embodiment of a typical apparatus 700 incorporating features that may be used to practice aspects of the invention. As shown, a computer system 702 may be linked to another computer system 704, such that the computers 702 and 704 are capable of sending information to each other and receiving information from each other. In one embodiment, computer system 702 could include a server computer adapted to communicate with a network 706. Computer systems 702 and 704 can be linked together in any conventional manner including, for example, a modem, hard wire connection, or fiber optic link. Generally, information can be made available to both computer systems 702 and 704 using a communication protocol typically sent over a communication channel or through a dial-up connection on ISDN line. Computers 702 and 704 are generally adapted to utilize program storage devices embodying machine-readable program source code, which is adapted to cause the computers 702 and 704 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 702 and 704 may also include a microprocessor for executing stored programs. Computer 702 may include a data storage device 707 on its program storage device for the storage of information and data. The computer program or software incorporating the processes and method steps incorporating aspects of the invention may be stored in one or more computers 702 and 704 on an otherwise conventional program storage device. In one embodiment, computers 702 and 704 may include a user interface 710, and a display interface 712 from which aspects of the invention can be accessed. The user interface 710 and the display interface 712 can be adapted to allow the input of queries and commands to the system, as well as present the results of the commands and queries.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

The invention claimed is:

1. A method comprising:
    identifying, by a processor, an initiated task on a mobile communication device to be held for transfer to a computer device for effecting continuation of the identified task on the computer device;
    causing compilation of related documents, data, and information relating to the identified task into a task file associated with the identified task;
    receiving notes related to completion of the identified task, wherein the notes are separate from the identified task;
    associating the notes with the task file;
    causing transfer of the identified task and the task file from the mobile communication device to the computer device for continuing performance of the identified task, and
    causing synchronization of a web browser on the computer device with a web browser on the mobile communication device by causing transfer of both active and passive data relating to browser settings and preferences to establish a seamless similarity of browsing experience between the web browser of the mobile communication device and the web browser of the computer device.

2. The method according to claim 1 further comprising: causing presentation of the notes related to completion of the identified task on the computer device.

3. The method according to claim 1 further comprising establishing a wireless communication connection between the mobile communication device and the computer device.

4. The method according to claim 3 wherein the wireless communication connection is a two way communication adapted to allow tasks initiated on the computer device to be identified and transferred to the mobile communication device.

5. The method according to claim 1 wherein the data in the identified task file includes related formats and protocols.

6. The method according to claim 1 further comprising causing display of a notification on the computer device regarding the identified task.

7. The method according to claim 1 further comprising causing display of a prompt on the mobile communication device reminding the user to check the identified task on the computer device.

8. The method according to claim 1 wherein the identified task comprises an e-mail message received on a mobile device to be answered on the computer device.

9. The method according to claim 1 wherein the identified task comprises a document obtained using the mobile terminal to be read on the computer device.

10. A method comprising:
    identifying, by a processor, an initiated task on a computer device to be held for transfer to a mobile communication device for effecting continuation of the task on the mobile communication device;
    causing compilation of related documents, data, and information relating to the identified task into a task file associated with the identified task;
    receiving notes related to completion of the identified task, wherein the notes are separate from the identified task;
    associating the notes with the task file;
    causing transfer of the identified task and the task file from the computer device to the mobile communication device for continuing performance of the identified task; and
    causing synchronization of a web browser on the computer device with a web browser on the mobile communication device by causing transfer of both active and passive data relating to browser settings and preferences to establish a seamless similarity of browsing experience between the web browser of the mobile communication device and the web browser of the computer device.

11. An apparatus comprising a processor and a memory including computer program code, the memory and the computer program code configured to, with the processor, cause the apparatus to:
    identify an initiated task on a mobile communication device to be held for transfer to a computer device for effecting continuation of the identified task on the computer device;
    cause compilation of related documents, data, and information relating to the identified task into a task file associated with the identified task;
    receive notes related to completion of the identified task, wherein the notes are separate from the identified task;
    associate the notes with the task file;
    cause transfer of the identified task and the task file from the mobile communication device to the computer device for continuing performance of the identified task and
    cause synchronization of a web browser on the computer device with a web browser on the mobile communication device by causing transfer of both active and passive data relating to browser settings and preferences to establish a seamless similarity of browsing experience between the web browser of the mobile communication device and the web browser of the computer device.

12. An apparatus comprising a processor and a memory including computer program code, the memory and the computer program code configured to, with the processor, cause the apparatus to:
    identify an initiated task on a computer device to be held for transfer to a mobile communication device for effecting continuation of the identified task on the mobile communication device;
    cause compilation of related documents, data, and information relating to the identified task into a task file associated with the identified task;
    receive notes related to completion of the identified task, wherein the notes are separate from the identified task;
    associate the notes with the task file;

cause transfer of the identified task and the task file from the computer device to the mobile communication device for continuing performance of the identified task; and cause synchronization of a web browser on the computer device with a web browser on the mobile communication device by causing transfer of both active and passive data relating to browser settings and preferences to establish a seamless similarity of browsing experience between the web browser of the mobile communication device and the web browser of the computer device.

13. Computer program product comprising a non-transitory computer readable medium having program code portions stored thereon, the program code portions being a computer readable medium and configured when said program product is run on a computer or network device, to:

identify an initiated task on a mobile communication device to be held for transfer to a computer device for effecting continuation of the identified task on the computer device;

cause compilation of related documents, data, and information relating to the identified task into a task file associated with the identified task;

receive notes related to completion of the identified task, wherein the notes are separate from the identified task;

associate the notes with the task file;

cause transfer of the identified task and the task file from the mobile communication device to the computer device for continuing performance of the identified task; and cause synchronization of a web browser on the computer device with a web browser on the mobile communication device by causing transfer of both active and passive data relating to browser settings and preferences to establish a seamless similarity of browsing experience between the web browser of the mobile communication device and the web browser of the computer device.

14. The method of claim 1, wherein causing transfer of the identified task and task file includes transmitting instructions to the computer device to cause presentation of a prompt with the notes on the computer device.

15. The method of claim 1, wherein receiving notes comprises receiving at least one of: a reminder regarding the identified task; a title of the identified task; an indication of the degree of completion of the identified task; or user comments relating to the identified task.

16. The method of claim 10, wherein causing transfer of the identified task and the task file includes transmitting instructions to the mobile communication device to cause presentation of a prompt with the notes on the mobile communication device.

17. The method of claim 10, wherein receiving notes comprises receiving at least one of: a reminder regarding the identified task; a title of the identified task; an indication of the degree of completion of the identified task; or user comments relating to the identified task.

* * * * *